US012498103B1

(12) United States Patent
Witton

(10) Patent No.: US 12,498,103 B1
(45) Date of Patent: Dec. 16, 2025

(54) REUSABLE ACCESSORY FOR CHANGING COLOR OF RECESSED LIGHT FIXTURE

(71) Applicant: SPECTROM PRODUCTS INC., Oakville (CA)

(72) Inventor: Tanner Witton, Oakville (CA)

(73) Assignee: SPECTROM PRODUCTS INC., Oakville (CA)

( * ) Notice: Subject to any disclaimer, the term of this patent is extended or adjusted under 35 U.S.C. 154(b) by 0 days.

(21) Appl. No.: 18/745,230

(22) Filed: Jun. 17, 2024

(51) Int. Cl.

| | |
|---|---|
| ***F21V 9/40*** | (2018.01) |
| ***F21S 8/02*** | (2006.01) |
| ***F21V 14/00*** | (2018.01) |
| ***F21V 17/02*** | (2006.01) |

(52) U.S. Cl.
CPC ................ *F21V 9/40* (2018.02); *F21S 8/026* (2013.01); *F21V 14/006* (2013.01); *F21V 17/02* (2013.01)

(58) Field of Classification Search
CPC .......... F21V 9/40; F21V 17/002; F21V 17/06; F21V 17/105; F21V 17/108; F21S 8/026
See application file for complete search history.

(56) References Cited

U.S. PATENT DOCUMENTS

| | | | | |
|---|---|---|---|---|
| 5,143,443 | A | 9/1992 | Madsen | |
| 7,500,766 | B1 | 3/2009 | Reynolds | |
| 8,684,569 | B2 | 4/2014 | Pickard et al. | |
| 9,611,993 | B2 | 4/2017 | Olson | |
| 10,663,145 | B2 | 5/2020 | Urban | |
| 2005/0168986 | A1 | 8/2005 | Wegner | |
| 2005/0265016 | A1 | 12/2005 | Rappaport | |
| 2007/0183154 | A1* | 8/2007 | Robson | F21V 17/164 362/267 |
| 2008/0137347 | A1 | 6/2008 | Trott et al. | |

(Continued)

FOREIGN PATENT DOCUMENTS

| | | |
|---|---|---|
| CN | 203299484 U | 11/2013 |

OTHER PUBLICATIONS

"3" LED Cube Light Amber Covers, LTEODCHEW 2Pcs 3 Inch LED Pods Covers Yellow Square Light Covers Protective Polycarbonate Light Bar Lens Covers LED Cube Covers Fog Lights", Amazon Canada. (n.d.). https://www.amazon.ca/Teochew-LED-Covers-Square-Protective-Polycarbonate/dp/B07M5K1GGH/.

(Continued)

*Primary Examiner* — Sean P Gramling
(74) *Attorney, Agent, or Firm* — Bhole IP Law; Anil Bhole; Chris Dynowski

(57) ABSTRACT

A color change accessory for a recessed light fixture comprises a sheet-like translucent body sized and shaped to cover a bulb of the recessed light fixture and at least partially cover a trim thereof located below a downwardly-facing surface of a support structure carrying the fixture. The translucent material is configured to pass light of a predetermined color therethrough. Further, the accessory includes a fastener supported on one face of the sheet-like translucent body at or adjacent a peripheral edge thereof and configured for mounting to the trim in a mounted condition. The fastener is in the form of one or more strips of material applied to the face of the sheet-like translucent body and extending along a substantially endless path following the peripheral edge thereof. A related method of use comprises mounting the sheet-like translucent body to the fixture and, later, removing the body therefrom.

21 Claims, 2 Drawing Sheets

(56) References Cited

U.S. PATENT DOCUMENTS

| | | | | |
|---|---|---|---|---|
| 2008/0142829 | A1 | 6/2008 | Negley | |
| 2010/0002451 | A1 | 1/2010 | Reynolds | |
| 2011/0157900 | A1 | 6/2011 | Garner | |
| 2015/0043210 | A1 | 2/2015 | Liu et al. | |
| 2015/0362159 | A1* | 12/2015 | Ludyjan | F21K 9/20<br>362/277 |
| 2017/0114985 | A1 | 4/2017 | Wang et al. | |
| 2022/0221134 | A1* | 7/2022 | Fu | F21V 17/02 |

OTHER PUBLICATIONS

"Amber LED Cube Light Covers, Nirider 2Pcs 3 Inch Transparent Yellow Light Bar Covers for Square LED Pods, Work Lights, Off Road Lights, Driving Lights, Fog Lights", Amazon Canada. (n.d.). https://www.amazon.ca/Nirider-LED-Light-Bar-Cover/dp/B07QM55GBG.

* cited by examiner

REUSABLE ACCESSORY FOR CHANGING COLOR OF RECESSED LIGHT FIXTURE

TECHNICAL FIELD

The following relates to a reusable accessory for changing color of light emitted from a recessed light fixture in a support structure.

BACKGROUND

Recessed light fixtures, commonly referred to in Canada as pot lights and which may be referred to in USA as can or canister lights, usually have a single color of light for illumination of a space, that is, the recessed light fixtures include single color bulbs, usually of white or yellow light.

It is desirable for some occasions to change lighting color, for example to mark cultural or social events; however, it is costly to replace single color bulbs with other single color bulbs of a different color or with smart bulbs which may be remotely controlled by a computing device to output different colors. Moreover, there exist types of recessed light fixtures, which may be referred to as sealed types of recessed light fixtures, in which the bulb is integrated within a housing of the fixture and cannot be replaced without replacing the fixture as a whole.

SUMMARY

According to an aspect of the disclosure, there is provided an accessory for changing an observed color of light emitted from a recessed light fixture carried by a support structure, wherein the recessed light fixture has a bulb configured to emit visible light and a trim in the form of an annular flange encompassing the bulb and located below a downwardly-facing surface of the support structure, the accessory comprising:

- a planar body of translucent material sized and shaped to substantially cover the bulb and at least partially cover the trim, wherein the planar body of translucent material has a first face, a second face opposite thereto, and a peripheral edge, wherein the translucent material is configured to pass light of a predetermined color therethrough; and
- a fastener supported on the second face of the planar body of translucent material at or adjacent the peripheral edge thereof and configured for mounting to the trim in a mounted condition of the color change accessory in which the planar body of translucent material is substantially registered with the bulb, wherein the fastener is in the form of one or more strips of material applied to the second face and extending along a substantially endless path following the peripheral edge of the planar body of translucent material.

This provides a simple color filter for a recessed light fixture operative for changing an observed color of light from the recessed light fixture without replacing a bulb of the fixture.

According to another aspect of the disclosure, there is provided a recessed light assembly comprising:

- a housing configured for mounting to a support structure, wherein the housing forms a bulb-receiving receptacle and is configured for electrical connection to an electrical power source to deliver electrical power therefrom and to the bulb-receiving receptacle;
- a bulb configured to be supported in the bulb-receiving receptacle of the housing and to be electrically connected to the electrical power source via the housing, wherein the bulb is configured to emit visible light;
- a trim in the form of an annular flange supported by the housing and encompassing the bulb, wherein the trim is arranged to be located below a downwardly-facing surface of the support structure; and
- a color change accessory for changing an observed color of the light emitted from the bulb, wherein the color change accessory comprises:
  - a planar body of translucent material sized and shaped to cover the bulb and at least partially cover the trim, wherein the planar body of translucent material has a first face, a second face opposite thereto, and a peripheral edge, wherein the translucent material is configured to pass light of a predetermined color therethrough; and
  - a fastener supported on the second face of the planar body of translucent material at or adjacent the peripheral edge thereof and configured for mounting to the trim in a mounted condition of the color change accessory in which the planar body of translucent material is substantially registered with the bulb, wherein the fastener is in the form of one or more strips of material applied to the second face and extending along a substantially endless path following the peripheral edge of the planar body of translucent material.

In one arrangement, the fastener comprises adhesive.

In one arrangement, the adhesive has a thickness measured in a direction normal to the second face of the planar body of plastic material between about 0.1 mm to about 0.9 mm.

In one arrangement, the thickness of the adhesive is about 0.14 mm.

In one arrangement, the adhesive is releasable such that the color change accessory is removable from the trim.

In one arrangement, the color change accessory further includes a removable liner configured to cover the adhesive in an unmounted condition of the color change accessory in which the color change accessory is detached from the trim.

In one arrangement, the adhesive is in the form of a plurality of strips arranged at spaced apart locations about the peripheral edge of the planar body of translucent material so as to provide gaps therebetween. These gaps act to permit exchange of air in the mounted condition between an ambient environment and an interior space delimited by the bulb and the planar body of translucent material.

In one arrangement, the translucent material is a plastics material.

Preferably, the plastics material is substantially rigid.

For example, the plastics material is polycarbonate.

In another arrangement, the fastener comprises magnetic material configured to be magnetically attracted to the trim so as to magnetically attach thereto. Typically, the magnetic material is attached to the second face by adhesive.

According to yet another aspect of the disclosure, there is provided a method for changing an observed color of a recessed light fixture carried by a support structure, wherein the recessed light fixture has a bulb configured to emit visible light and a trim in the form of an annular flange encompassing the bulb and located below a downwardly-facing surface of the support structure, the method comprising:

- mounting to the recessed light fixture a translucent colored sheet-like body, which is sized and shaped to substantially cover the bulb of the recessed light fixture, such that the observed color of light from the recessed light fixture corresponds to filtered light passing through the sheet-like body; and removing the translucent colored sheet-like body from the recessed light fixture, such that the observed color of light from the recessed light fixture corresponds to unfiltered light emitted from a bulb of the recessed light fixture.

In one arrangement, the translucent colored sheet-like body is mounted to the recessed light fixture by adhesion to the trim.

In one such arrangement, the method further comprises, after removing the translucent colored sheet-like body from the recessed light fixture, covering an adhesive layer of the translucent colored sheet-like body for storage.

In one arrangement, the adhesive layer is covered with a releasable liner.

In one arrangement, prior to mounting the translucent colored sheet-like body to the recessed light fixture, the method further comprises removing a releasable liner which is covering the adhesive layer of the translucent colored sheet-like body to expose the adhesive layer for subsequent adhesion, and storing the releasable liner for use in covering the adhesive layer after removing the translucent colored sheet-like body from the recessed light fixture.

In another arrangement, the translucent colored sheet-like body is mounted to the recessed light fixture by magnetic attachment to the trim.

These and other aspects are contemplated and described herein. It will be appreciated that the foregoing summary sets out representative aspects of accessories, recessed light fixture assemblies and methods for changing an observed color of light emitted from a recessed light fixture, in order to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
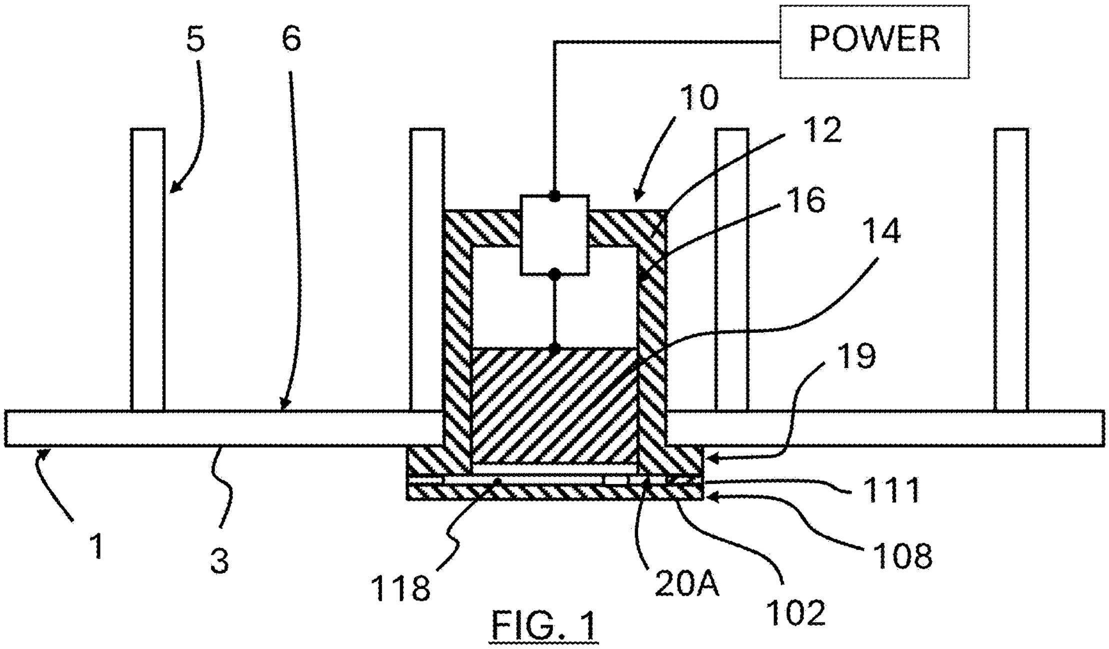
FIG. 1 is a cross-sectional view taken along line 1-1 in FIG. 2 schematically showing a color change accessory in a mounted condition relative to a recessed light fixture, according to an arrangement of the invention.
Figure 2:
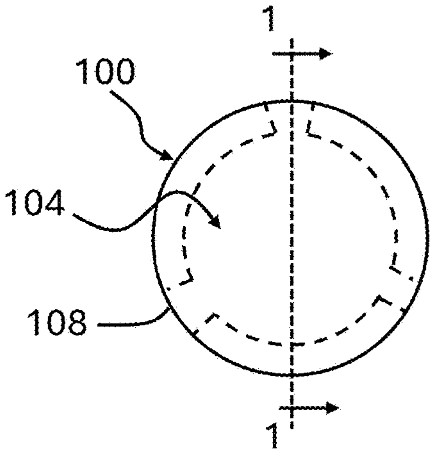
FIG. 2 is a bottom plan view of the accessory of FIG. 1.
Figure 3:
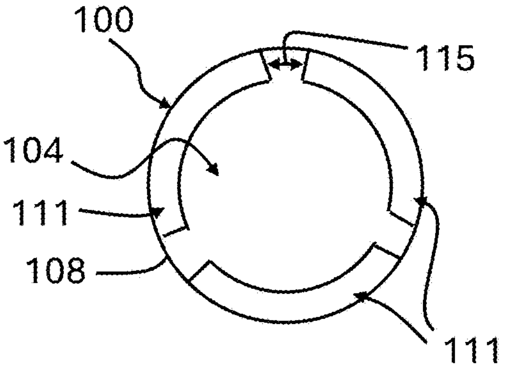
FIG. 3 is a top plan view of the accessory of FIG. 1.
Figure 4:
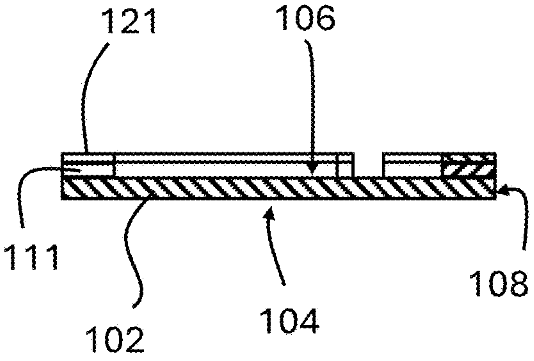
FIG. 4 is a cross-sectional view like FIG. 1 showing the accessory with a removable liner, according to an arrangement of the invention.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

In the accompanying figures there is shown a color change accessory 100 for changing an observed color of light emitted from a recessed light fixture 10 carried by a support structure 1. The recessed light fixture 10 generally comprises a housing 12 configured for mounting to the support structure 1; a bulb 14 configured to be supported in a bulb-receiving receptacle 16 formed by the housing 12 and to be electrically connected to an electrical power source EPS via the housing which is configured for electrical connection to the power source in order to deliver electrical power to the bulb-receiving receptacle; and a trim 19 in the form of an annular flange supported by the housing 12 and encompassing the bulb. It will be appreciated that in the illustrated arrangement, the bulb 14 is permanently attached to the housing as not to be removable therefrom. In other arrangements, the bulb is removably supported in the housing as to be removable therefrom, for example, for replacement with another bulb. Also, it will be appreciated that in the illustrated arrangement, the trim 19 is integrated with the housing 12 such that they are unitary. The trim has a lower surface 20A spanning between an outer edge and an inner edge adjacent the bulb 14, which surface is preferably planar and smooth. The bulb 14 is configured to emit visible light, which typically appears white or yellow in color depending on a predetermined color temperature of the bulb. Also, it will be appreciated the trim is arranged to be located below a downwardly-facing surface 3 of the support structure. In the illustrated arrangement, the support structure is a ceiling of a building interior having a plurality of trusses 5 arranged in parallel relation to each other and drywall 6 mounted to bottoms of the trusses to form a finished interior surface of the ceiling. In the illustrated arrangement, the drywall 6 defines the downwardly-facing surface 3 of the ceiling support structure. It will be appreciated that in other arrangements the support structure may be a roof overhang of a building exterior having trusses arranged in parallel relation to each other and a soffit mounted to bottoms of the trusses to form a finished exterior surface.

Typically, the recessed light fixture 10 is generally circular in shape in bottom plan view, such that the trim 19 is a circular-shaped annular flange and the bulb 14 is rounded in horizontal cross-sectional shape.

Turning now to the color change accessory 100, this generally comprises a planar or sheet-like body of translucent material 102 sized and shaped to cover the bulb 14 and at least partially cover the trim 19. The sheet-like translucent body has a first face 104, a second face 106 opposite thereto, and a peripheral edge 108. The translucent material 102 is configured to pass light of a predetermined color therethrough, for example, by being of the predetermined color, such that the light that passes through is of the same color.

When the recessed light fixture is circular in bottom plan shape, the planar body of translucent material may be referred to as a disc of the translucent material. In order to cover the bulb and at least partially cover the trim, in the illustrated arrangement the sheet-like translucent body is sized and shaped to substantially match the trim. At minimum, for satisfactory mounting, the sheet-like body has a common shape as the trim, which is usually the same as an outer shape of the bulb, and the sheet-like body is sized, particularly in diameter, to be larger than the bulb and about as large as the trim, as to at least partially cover the trim when the bulb is fully covered thereby. It is possible that the diameter of the sheet-like translucent body is slightly larger than the trim.

The color change accessory 100 further generally comprises a fastener 111 supported on the second face 106 of the sheet-like translucent body at or adjacent the peripheral edge 108 thereof and configured for mounting to the trim 19 in a mounted condition of the color change accessory in which the planar body of translucent material is substantially registered with the bulb, meaning that in the mounted condition the bulb is fully covered by the translucent material. As such, when the sheet-like translucent body is sized and shaped to substantially match the trim, this means that in the mounted condition the peripheral edge 108 registers with the trim 19 or is located (slightly) outwardly thereof. The fastener 111 is in the form of one or more strips of material applied to the second face 106 and extending along a substantially endless path following the peripheral edge of the planar body of plastic material. In the illustrated arrangement, the fastener is disposed at the peripheral edge such that an outer edge of the strip-form fastener is registered with the peripheral edge 108 of the translucent body. The one or more fastener strips extend along a substantially endless path around a periphery of the translucent body in that the one or more strips collectively circumscribe a majority of the periphery leaving a minority portion of the periphery without fastener material.

It will be appreciated that in the mounted condition, the color change accessory and the recessed light fixture collectively form a recessed light fixture assembly configured to emit a predetermined color of light based on visible light emitted from the bulb of the fixture as modified or filtered by the translucent material of the accessory.

The fastener 111 comprises adhesive, that is, a layer of adhesive material. The adhesive has a thickness, which is measured in a direction normal to the second face of the planar body of translucent material, between about 0.1 mm and about 0.9 mm, and preferably between about 0.1 mm and about 0.2 mm. In the illustrated arrangements, the adhesive thickness is about 0.14 mm. Such a thickness resists against shearing force from wind when the accessory is used on outdoor fixtures. Furthermore, the adhesive is releasable such that the color change accessory is removable from the trim. In the illustrated arrangement of FIGS. 1-4, the fastener is the adhesive.

In the illustrated arrangement of FIGS. 1-4, the adhesive is in the form of a plurality of strips, specifically three, arranged at spaced apart locations about the peripheral edge 108 of the planar body of plastic material so as to provide gaps 115 therebetween. These gaps 115 act to permit exchange of air in the mounted condition between an ambient environment and an interior space 118 delimited between the bulb 14 and the planar translucent body 102. More specifically, in the illustrated arrangement, there are three adhesive strips which are spaced substantially equidistantly spaced each from the next around the peripheral edge 108.

The color change accessory further includes a removable liner 121 configured to cover the adhesive 111 in an unmounted condition of the color change accessory in which the color change accessory is detached from the trim. That is, the liner 121 is in the form of a sticker configured to cover a surface of the adhesive opposite to the second face 106 of the translucent body. When the adhesive is in the form of plural strips, the removable liner comprises plural pieces or segments of the liner for attaching to and covering respective ones of the adhesive strips. When the liner 121 is opaque as in the illustrated arrangements, portions of the translucent body which are registered therewith appear colored (in comparison to portions of the translucent body which are not registered with the liner) as to more clearly visually indicate the color of the filtered light formed by the accessory, thereby distinguishing the accessory from like accessories forming different colors of filtered light.

In the illustrated arrangement, the translucent material is a plastics material, which, preferably, is substantially rigid. For example, the plastics material is polycarbonate. Additionally, in the illustrated arrangement, the plastic material is transparent.

Figure 5:
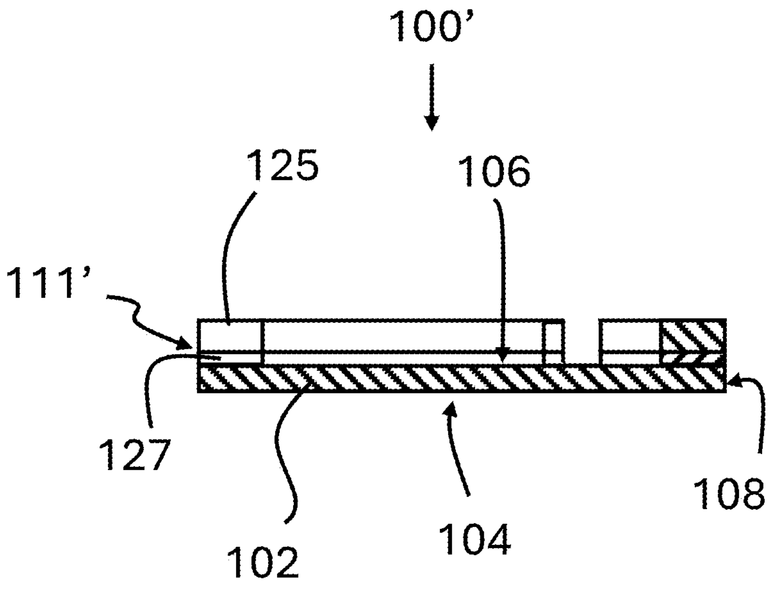
FIG. 5 is a cross-sectional view similar to FIG. 4 showing an accessory according to another arrangement of the invention.

In another arrangement of accessory indicated at 100' and shown in FIG. 5, a fastener 111' comprises magnetic material 125 configured to be magnetically attracted to the trim so as to magnetically attach thereto. It will be appreciated that in some arrangements of recessed light fixture, especially for an outdoor type thereof, the trim is made of a magnetizable metallic material, for example, a ferromagnetic material, and is therefore suited to receive an accessory by magnetic attachment thereto. The magnetic material is attached to the translucent body by adhesive, that is, by a layer of adhesive material 127. Besides the fastener 111' comprising magnetic and adhesive material, where the magnetic material is used for mechanical coupling to the trim, the accessory is otherwise substantially the same as that described hereinbefore with respect to FIGS. 1-4.

Further to the foregoing, there is also disclosed a method for changing an observed color of a recessed light fixture carried by a support structure. The method generally comprises the steps of:

- mounting to the recessed light fixture 10 a translucent colored sheet-like body 102, which is sized and shaped to substantially cover the bulb 14 of the recessed light fixture, such that the observed color of light from the recessed light fixture corresponds to filtered light passing through the plastic sheet; and
- removing the translucent colored plastic sheet from the recessed light fixture, such that the observed color of light from the recessed light fixture corresponds to 24 unfiltered light emitted from a bulb of the recessed light fixture.

Since the color change accessory is sold separately from the fixture, and when the translucent sheet-like body is mounted to the recessed light fixture by adhesion to the trim, the method typically further includes a step of removing a releasable liner which is covering the adhesive layer of the translucent colored disc to expose the adhesive layer for subsequent adhesion, which is performed prior to mounting the translucent colored disc to the recessed light fixture. Additionally, and generally in conjunction with the step of removing the releasable liner, the method also includes a step of storing the releasable liner for use in covering the adhesive layer for storage of the accessory, which is performed after the translucent colored disc is removed from the recessed light fixture. Accordingly, the method preferably also includes a step of covering the adhesive layer of the translucent colored disc for storage after the step of removing the translucent colored plastic sheet from the recessed light fixture.

Alternatively, the translucent colored sheet-like body is mounted to the recessed light fixture by magnetic attachment to the trim.

As described hereinbefore, the present invention relates to a unique accessory designed to enhance already installed light fixtures by offering a versatile and customizable color array to illuminate various spaces. The innovation lies in a post-application approach, where a tinted piece of translucent material, such as plastic, affixed with a 3M™ brand reusable sticker during manufacturing, can be added to a wide range of light fixtures.

The present invention uses a hard plastic polycarbonate, combined with a 3M™ 200MP reusable sticker, allowing for easy application and re-application. The accessory can be installed in one room and then removed and re-installed in a different room for a different occasion without tools.

Preferably, since the translucent material is in intimate relation with the bulb, and is thus exposed to heat generated thereby, the translucent material is configured to be resistant to deformation or degradation from heat up to a temperature between about 50° C. to about 120° C. For example, when the translucent material is polycarbonate plastic, it is preferably resistant to deformation up to a maximum temperature of 194° F./90° C.

The accessory provides customers with the ability to effortlessly change the color ambiance of their rooms for various occasions, such as color-themed parties, gender reveals, holidays, and more.

Thus the color change accessory is reusable and re-applicable.

Unlike existing lenses that typically replace clear lenses or are used during light installation, the present invention offers a post-installation method that adheres to any flat-surfaced light. The accessory may be manufactured in various shapes and sizes.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A recessed light assembly comprising:

a housing configured for mounting to a support structure, wherein the housing forms a bulb-receiving receptacle and is configured for electrical connection to an electrical power source to deliver electrical power therefrom and to the bulb-receiving receptacle;

a bulb configured to be supported in the bulb-receiving receptacle of the housing and to be electrically connected to the electrical power source via the housing, wherein the bulb is configured to emit visible light;

a trim in the form of an annular flange supported by the housing and encompassing the bulb, wherein the trim is arranged to be located below a downwardly-facing surface of the support structure; and a color change accessory for changing an observed color of the light emitted from the bulb, wherein the color change accessory comprises:

a planar body of translucent material sized and shaped to cover the bulb and to at least partially cover the trim, wherein the planar body of translucent material has a first face, a second face opposite thereto, and a peripheral edge, wherein the translucent material is configured to pass light of a predetermined color therethrough; and a fastener supported on the second face of the planar body of translucent material at or adjacent the peripheral edge thereof and configured for mounting to the trim in a mounted condition of the color change accessory in which the planar body of translucent material is substantially registered with the bulb, wherein the fastener is in the form of one or more strips of material applied flat to the second face and respectively extending along a path following the peripheral edge of the planar body of translucent material, wherein the path of each of the one or more strips of material terminates to form a gap between opposed ends of the one or more strips for permitting exchange of air between an ambient environment and an interior space between the bulb and the planar body of translucent material in the mounted condition of the color change accessory.

2. The recessed light assembly of claim 1 wherein the fastener comprises adhesive.

3. The recessed light assembly of claim 2 wherein the adhesive has a thickness measured in a direction normal to the second face of the planar body of plastic material between about 0.1 mm and about 0.9 mm.

4. The recessed light assembly of claim 2 wherein the adhesive is releasable such that the color change accessory is removable from the trim.

5. The recessed light assembly of claim 4 wherein the color change accessory further includes a removable liner configured to cover the adhesive in an unmounted condition of the color change accessory in which the color change accessory is detached from the trim.

6. The recessed light assembly of claim 1 wherein the translucent material is a plastics material.

7. The recessed light assembly of claim 6 wherein the plastics material is substantially rigid.

8. The recessed light assembly of claim 6 wherein the plastics material is polycarbonate.

9. The recessed light assembly of claim 1 wherein the fastener comprises magnetic material configured to be magnetically attracted to the trim so as to magnetically attach thereto.

10. An accessory for changing an observed color of light emitted from a recessed light fixture carried by a support structure, wherein the recessed light fixture has a bulb configure to emit visible light and a trim in the form of an annular flange encompassing the bulb and located below a downwardly-facing surface of the support structure, the accessory comprising:

a planar body of translucent material sized and shaped to cover the bulb and to at least partially cover the trim, wherein the planar body of translucent material has a first face, a second face opposite thereto, and a peripheral edge, wherein the translucent material is configured to pass light of a predetermined color therethrough; and a fastener supported on the second face of the planar body of translucent material at or adjacent the peripheral edge thereof and configured for mounting to the trim in a mounted condition of the color change accessory in which the planar body of translucent material is substantially registered with the bulb, wherein the fastener is in the form of one or more strips of material applied flat to the second face and respectively extending along a path following the peripheral edge of the planar body of translucent material, wherein the path of each of the one or more strips of material terminates to form a gap between opposed ends of the one or more strips for permitting exchange of air between an ambient environment and an interior space between the bulb and the planar body of translucent material in the mounted condition of the color change accessory.

11. The accessory of claim 10 wherein the fastener comprises adhesive.

12. The accessory of claim 11 wherein the adhesive has a thickness measured in a direction normal to the second face of the planar body of plastic material between about 0.1 mm and about 0.9 mm.

13. The accessory of claim 11 wherein the adhesive is releasable such that the color change accessory is removable from the trim.

14. The accessory of claim 13 further including a removable liner configured to cover the adhesive in an unmounted condition of the color change accessory in which the color change accessory is detached from the trim.

15. The accessory of claim 10 wherein the translucent material is a plastics material.

16. The accessory of claim 15 wherein the plastics material is substantially rigid.

17. The accessory of claim 15 wherein the plastics material is polycarbonate.

18. The accessory of claim 10 wherein the fastener comprises magnetic material configured to be magnetically attracted to the trim so as to magnetically attach thereto.

19. A method for changing an observed color of a recessed light fixture carried by a support structure, wherein the recessed light fixture has a bulb and a trim in the form of an annular flange encompassing the bulb and located below a downwardly-facing surface of the support structure, the method comprising:

sticking a translucent colored sheet-like body to a downwardly-facing surface of the trim of the recessed light fixture, the translucent colored sheet-like body being sized and shaped to substantially cover the bulb of the recessed light fixture, such that the observed color of light from the recessed light fixture corresponds to filtered light passing through the sheet-like body;

removing the translucent colored sheet-like body from the recessed light fixture, such that the observed color of light from the recessed light fixture corresponds to unfiltered light emitted from a bulb of the recessed light fixture; and after removing the translucent colored sheet-like body from the recessed light fixture, covering an adhesive layer of the translucent colored sheet-like body for storage.

20. The method of claim 19 wherein the adhesive layer is covered with a releasable liner.

21. The method of claim 19 further including:

prior to sticking the translucent colored sheet-like body to the recessed light fixture, removing a releasable liner which is covering the adhesive layer of the translucent colored sheet-like body to expose the adhesive layer for subsequent adhesion; and storing the releasable liner for use in covering the adhesive layer after removing the translucent colored sheet-like body from the recessed light fixture.

* * * * *